United States Patent
Feng et al.

(10) Patent No.: US 8,017,272 B2
(45) Date of Patent: Sep. 13, 2011

(54) ANODE OF A LITHIUM BATTERY AND METHOD FOR FABRICATING THE SAME

(75) Inventors: Chen Feng, Bei-Jing (CN); Hao-Xu Zhang, Bei-Jing (CN); Kai-Li Jiang, Bei-Jing (CN); Shou-Shan Fan, Bei-Jing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 830 days.

(21) Appl. No.: 12/080,714

(22) Filed: Apr. 4, 2008

(65) Prior Publication Data
US 2009/0075171 A1 Mar. 19, 2009

(30) Foreign Application Priority Data
Sep. 14, 2007 (CN) .......................... 2007 1 0077110

(51) Int. Cl.
*H01M 4/13* (2010.01)
*H01M 4/60* (2010.01)
*H01M 4/02* (2006.01)

(52) U.S. Cl. .................. 429/231.8; 429/218.1; 429/213; 429/209

(58) Field of Classification Search ............... 429/231.8, 429/218.1, 213, 209
See application file for complete search history.

(56) References Cited

U.S. PATENT DOCUMENTS

| | | | |
|---|---|---|---|
| 6,616,495 | B1 | 9/2003 | Tsuboi |
| 7,094,499 | B1 | 8/2006 | Hung |
| 7,189,476 | B1 | 3/2007 | Macklin et al. |
| 7,704,480 | B2 | 4/2010 | Jiang et al. |
| 2005/0008934 | A1 | 1/2005 | Oyama et al. |
| 2006/0261134 | A1 | 11/2006 | Ho |
| 2007/0190422 | A1 | 8/2007 | Morris |
| 2007/0237952 | A1 | 10/2007 | Jiang et al. |

FOREIGN PATENT DOCUMENTS

CN 1475437 A 2/2004
(Continued)

OTHER PUBLICATIONS

Zhang et al., "Spinning and Processing Continuous Yarns from 4-inch Wafer Scale Super Aligned Carbon Nanotube Arrays", Advance material, vol. 18, p. 1505-1510,2006.

(Continued)

*Primary Examiner* — Helen O Conley
(74) *Attorney, Agent, or Firm* — Altis Law Group, Inc.

(57) ABSTRACT

An anode of a lithium battery includes a composite film, the composite film comprising a carbon nanotube film structure and a plurality of nanoscale tin oxide particles dispersed therein. A method for fabricating an anode of a lithium battery, the method includes the steps of: (a) providing an array of carbon nanotubes; (b) pulling out, by using a tool, at least two carbon nanotube films from the array of carbon nanotubes to form a carbon nanotube film structure; and (c) dispersing a plurality of nanoscale tin oxide particles in the carbon nanotube film structure to form a composite film, and thereby, achieving the anode of the lithium battery.

13 Claims, 5 Drawing Sheets

FOREIGN PATENT DOCUMENTS

| | | |
|---|---|---|
| CN | 1485940 A | 3/2004 |
| JP | H07-14582 | 1/1995 |
| JP | 2004319186 | 11/2004 |
| TW | 518786 | 1/2003 |
| TW | 558850 | 10/2003 |
| TW | I238555 | 1/2005 |
| TW | 200524201 | 7/2005 |
| TW | 200640564 | 12/2006 |
| TW | 200722368 | 6/2007 |
| TW | 200724486 | 7/2007 |
| WO | 2007069562 | 6/2007 |

OTHER PUBLICATIONS

Wu et al., "Transparent, Conductive Carbon nanotube Films", Science, vol. 305, p. 1273-1276, 2004.

Niu et al., High power electrochemical capacitors based on carbon nanotube electrodes, Appl. Phys. Lett. 70(11), Mar. 17, 1997, pp. 1480-1482.

(a) providing an array of carbon nanotubes (b) pulling out, by using a tool, at least two carbon nanotube films from the array of carbon nanotubes to form a carbon nanotube film structure (c) dispersing a plurality of nanoscale tin oxide particles in the carbon nanotube film structure to form a composite film, and thereby, achieving the anode of the lithium battery

ANODE OF A LITHIUM BATTERY AND METHOD FOR FABRICATING THE SAME

RELATED APPLICATIONS

This application is related to commonly-assigned application entitled, "CATHODE OF LITHIUM BATTERY AND METHOD FOR FABRICATING THE SAME", application Ser. No. 12/080,717, filed on Apr. 4, 2008. Disclosure of the above-identified application is incorporated herein by reference.

BACKGROUND

1. Field of the Invention

The present invention relates to anodes of lithium batteries and methods for fabricating the same and, particularly, to a carbon-nanotube-based anode of a lithium battery and a method for fabricating the same.

2. Discussion of Related Art

In recent years, lithium batteries have received a great amount of attention. Lithium batteries are used in various portable devices, such as notebook PCs, mobile phones and digital cameras. Generally, lithium batteries have small weight, high discharge voltage, long cyclic life and high energy density compared with conventional lead storage batteries, nickel-cadmium batteries, nickel-hydrogen batteries, and nickel-zinc batteries.

An anode of a lithium battery should have such properties as high energy density; low open-circuit voltage versus metallic lithium electrode; high capacity retention; good performance in common electrolytes; high density (e.g. >2.0 g/cm$^3$); good stability during charge and discharge processes and low cost. At present, the most widely used anode active material is carbonous/carbonaceous material such as natural graphite, artificial graphite and amorphous-based carbon. Amorphous-based carbon has excellent capacity, but the irreversibility thereof is relatively high. The theoretical maximum capacity of natural graphite is 372 mAh/g, but the lifetime thereof is generally short.

To be used as an anode active material, compared with the carbonous/carbonaceous materials, a metallic material with high capacity is used. For example, the capacity of tin can be above 1000 mAh/g. Thus, in most lithium batteries, a tin film is formed on a current collector to achieve the anode. However, during charge/discharge processes, the size of the anode can increase by as much as 600%. As such, the tin film may be pulverized. As such, the capacity of the lithium battery using tin anode decreases rapidly due to the above-described processes.

What is needed, therefore, is to provide an anode of a lithium battery and a method for fabricating the same, in which the above problems are eliminated or at least alleviated.

SUMMARY

In one embodiment, an anode of a lithium battery includes a composite film, the composite film comprising a carbon nanotube film structure and a plurality of nanoscale tin oxide particles dispersed therein.

Other advantages and novel features of the present carbon-nanotube-based anode of a lithium battery and the related method for fabricating the same will become more apparent from the following detailed description of the preferred embodiments when taken in conjunction with the accompanying drawings.

BRIEF DESCRIPTION OF THE DRAWINGS

Many aspects of the present carbon-nanotube-based anode of a lithium battery and the related method for fabricating the same can be better understood with reference to the following drawings. The components in the drawings are not necessarily to scale, the emphasis instead being placed upon clearly illustrating the principles of the present carbon-nanotube-based anode of a lithium battery and the related method for fabricating the same.

Corresponding reference characters indicate corresponding parts throughout the several views. The exemplifications set out herein illustrate at least one preferred embodiment of the present carbon-nanotube-based anode of lithium battery and the related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present carbon-nanotube-based anode of lithium battery and related method for fabricating the same.

Figure 1:
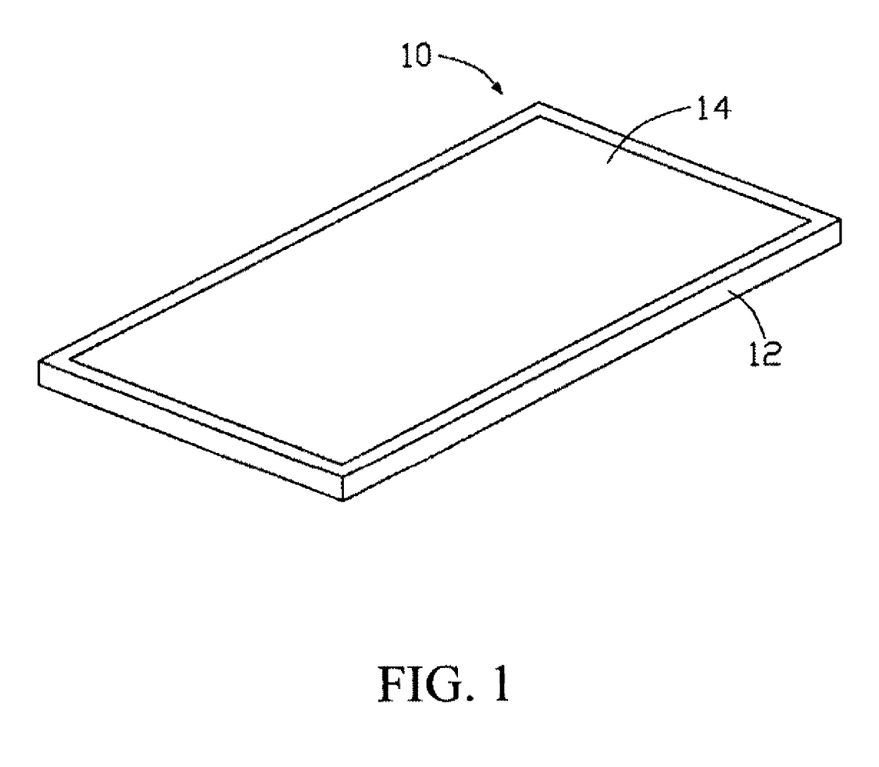
FIG. 1 is a schematic view of an anode of a lithium battery, in accordance with a present embodiment.
Figure 2:
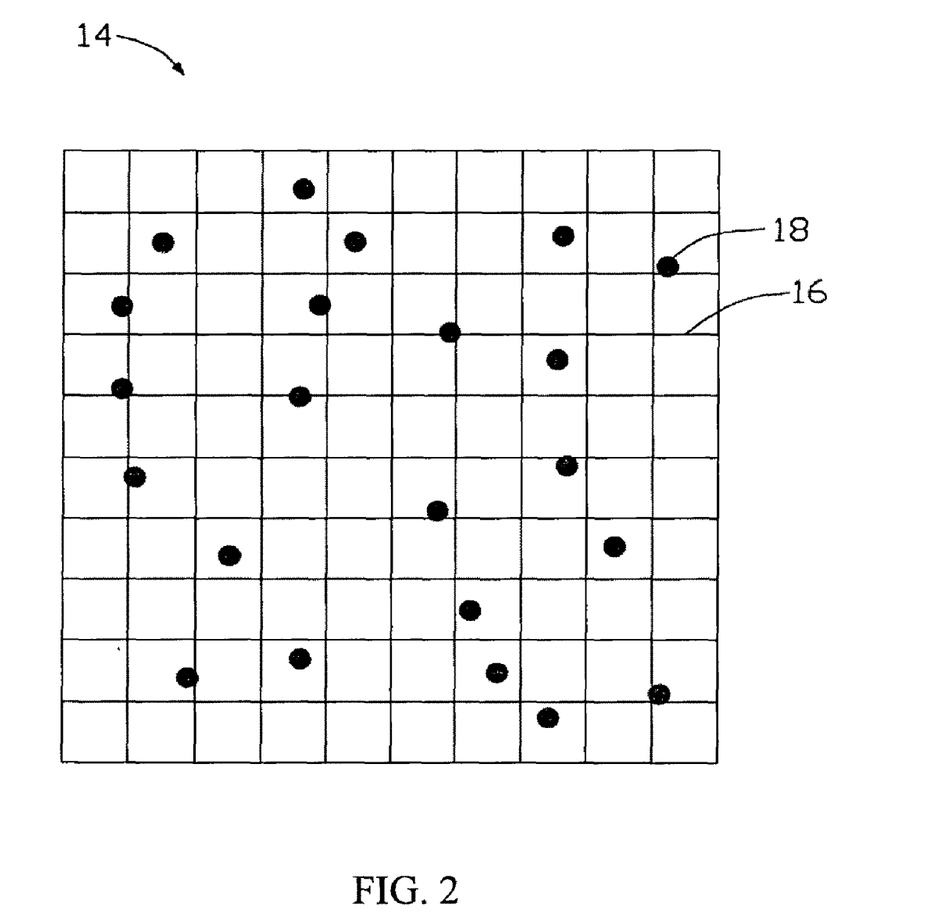
FIG. 2 is a schematic view of a composite film used in the anode of the lithium battery of FIG. 1.

Referring to FIG. 1 and FIG. 2, an anode 10 in the present embodiment includes a current collector 12 and a composite film 14 disposed on the current collector 12. The supporting member 12 can, beneficially, be a metal substrate. Quite suitably, the metal substrate is a copper sheet. The composite film 14 includes a carbon nanotube film structure 16 and a plurality of nanoscale tin oxide particles 18 dispersed in the carbon nanotube film structure 16.

The carbon nanotube film structure 16 includes at least two overlapped carbon nanotube films. Each carbon nanotube film includes a plurality of successive carbon nanotube bundles joined end to end and are aligned in the same direction. The at least two carbon nanotube films cross and overlap with each other. The number of the carbon nanotube films and the angle between the aligned directions of two adjacent carbon nanotube films is arbitrarily set.

In the present embodiment, a width of the carbon nanotube film structure 16 can, suitably, be in the approximate range from 1 centimeter to 10 centimeters, and a thickness of the carbon nanotube film structure 16 can, usefully, be in the approximate range from 0.01 micron to 100 microns. The carbon nanotube film structure 16 having a plurality of micropores defined by the spacing/gaps between adjacent carbon nanotube bundles. The diameter of the resulting micropores can, beneficially, be less than 100 nanometers.

Figure 4:
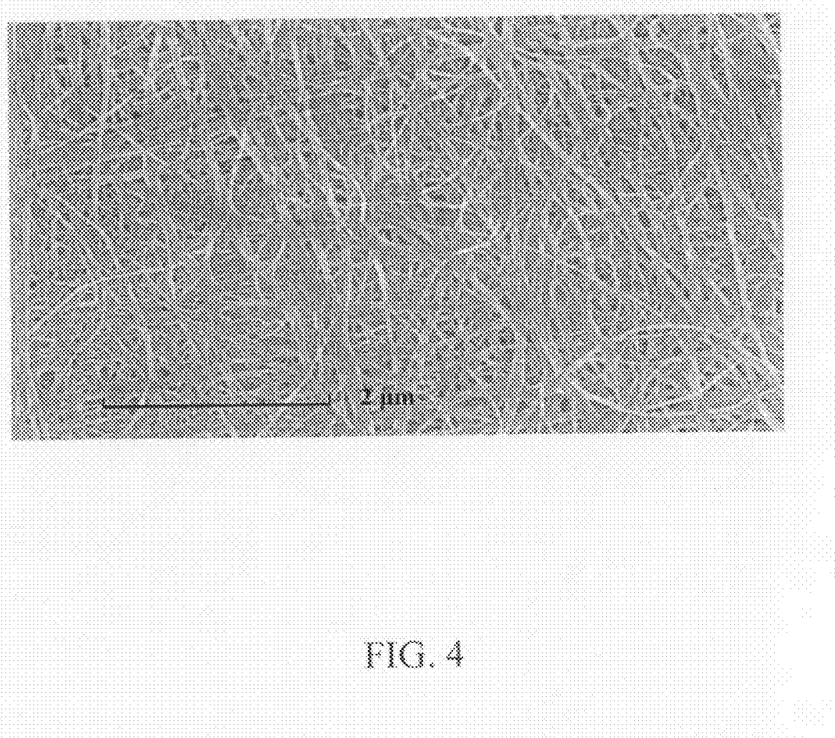
FIG. 4 shows a Scanning Electron Microscope (SEM) image of a carbon nanotube film structure, in accordance with the present embodiment.
Figure 5:
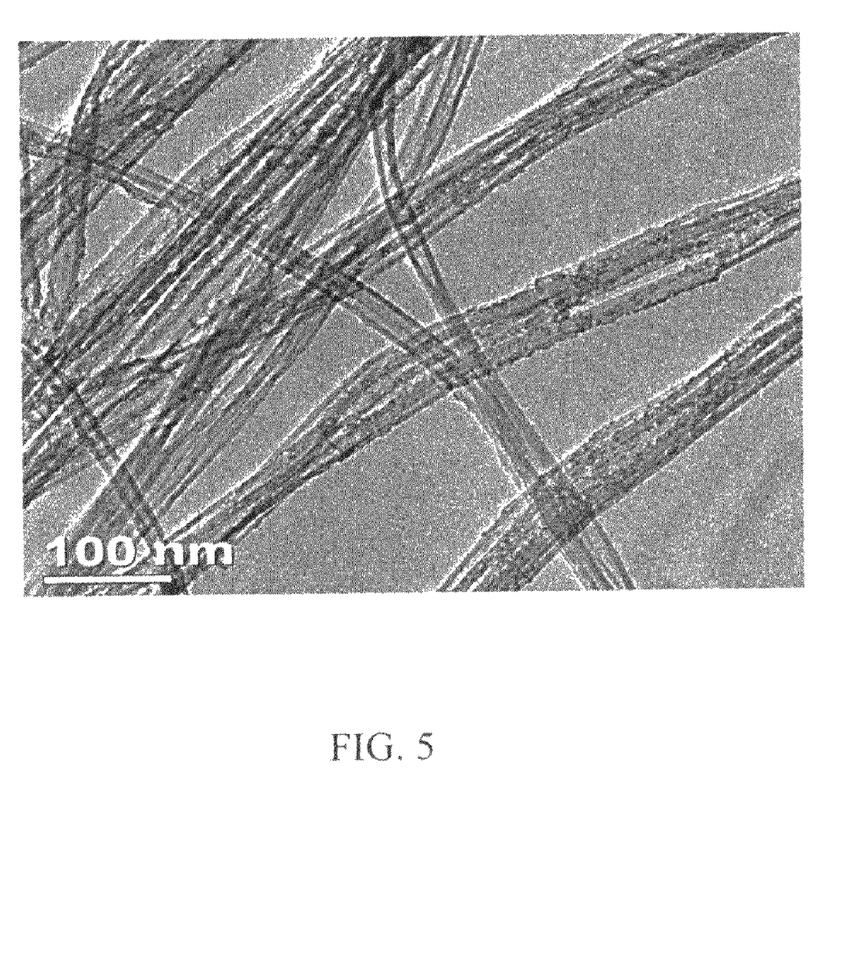
FIG. 5 shows a Transmission Electron Microscope (TEM) image of the composite film of FIG. 2.

Referring to FIG. 4, quite suitably, the carbon nanotube film structure includes 200 carbon nanotube films overlapping each other. In the present embodiment, the width of the carbon nanotube film structure 16 is about 5 centimeters, and the thickness of the carbon nanotube film structure 16 is about 50 microns. The angle between the aligned directions of two adjacent carbon nanotube films is about 90°. The diameter of each of the micropores is about 60 nanometers.

The nanoscale tin oxide particles 18 are adsorbed to the wall of the carbon nanotubes by van der Waals attractive force or filled into the spacing between adjacent carbon nanotube bundles of the carbon nanotube film structure 16. Quite suitably, the diameter of the nanoscale tin oxide particles 18 is in the approximate range from 3 nanometers to 10 nanometers. In the present embodiment, the diameter of the nanoscale tin oxide particles 18 is about 6 nanometers.

It is to be understood that, the current collector 12 in the anode 10 of the lithium battery in the present embodiment is optional. In another embodiment, the anode 10 of the lithium battery may only include the carbon nanotube film structure 16. Due to a plurality of carbon nanotube films being overlapped to form a self-sustained and stable film structure, the carbon nanotube film structure 16 can be used as the anode 10 in the lithium battery without the current collector 12.

The carbon nanotube film structure 16 in the present embodiment has extremely large specific area. As such, a relatively large amount of nanoscale tin oxide particles 18 can be adsorbed to the walls of the carbon nanotubes or filled into the micropores of the carbon nanotube film structure 16. Accordingly, the lithium battery using the above-described anode 10 has a large charge/discharge capacity owing to the nanoscale tin oxide particles 18, and a low discharge voltage owing to the carbon nanotubes. Further, because the carbon nanotube film structure 16 is stable, the volume change of the tin is restricted during the charge/discharge cycles.

Figure 3:
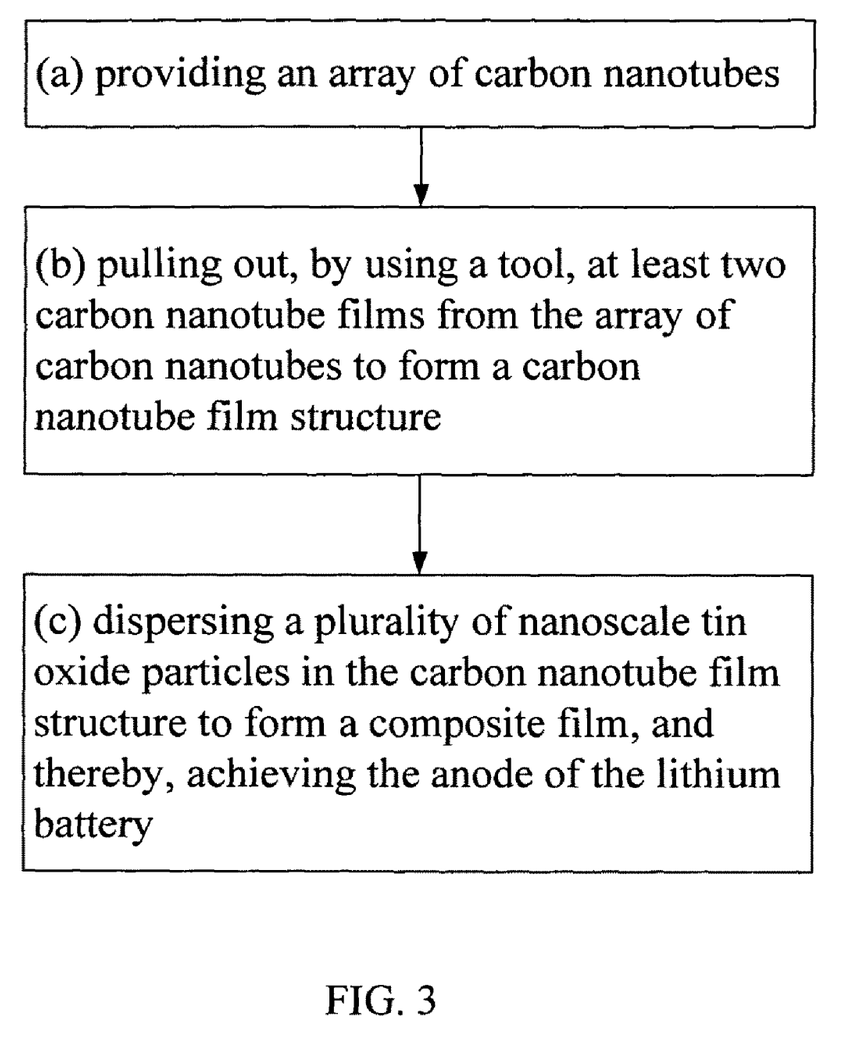
FIG. 3 is a flow chart of a method for fabricating the anode of the lithium battery of FIG. 1.

Referring to FIG. 3, a method for fabricating the anode 10 of the lithium battery includes the steps of: (a) providing an array of carbon nanotubes, quite suitably, providing a super-aligned array of carbon nanotubes; (b) pulling out at least two carbon nanotube films from the array of carbon nanotubes, by using a tool (e.g., adhesive tape or another tool allowing multiple carbon nanotubes to be gripped and pulled simultaneously) to form a carbon nanotube film structure 16; and (c) dispersing a plurality of nanoscale tin oxide particles 18 in the carbon nanotube film structure 16 to form a composite film 14; (d) providing a current collector 12 and disposing the composite film 14 on the current collector 12 to achieve the cathode 10 of the lithium battery.

In step (a), a given super-aligned array of carbon nanotubes can be formed by the steps of: (a1) providing a substantially flat and smooth substrate; (a2) forming a catalyst layer on the substrate; (a3) annealing the substrate with the catalyst at a temperature in the approximate range of 700° C. to 900° C. in air for about 30 to 90 minutes; (a4) heating the substrate with the catalyst at a temperature in the approximate range from 500° C. to 740° C. in a furnace with a protective gas therein; and (a5) supplying a carbon source gas into the furnace for about 5 to 30 minutes and growing a super-aligned array of the carbon nanotubes from the substrate.

In step (a1), the substrate can, beneficially, be a P-type silicon wafer, an N-type silicon wafer, or a silicon wafer with a film of silicon dioxide thereon. Quite suitably, a 4-inch P-type silicon wafer is used as the substrate.

In step (a2), the catalyst can, advantageously, be made of iron (Fe), cobalt (Co), nickel (Ni), or any combination alloy thereof.

In step (a4), the protective gas can, beneficially, be made up of at least one of nitrogen ($N_2$), ammonia ($NH_3$), and a noble gas. In step (a5), the carbon source gas can, advantageously, be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, be in a height of about 200 to 400 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are packed together closely by van der Waals attractive force. The carbon nanotubes in the super-aligned array of carbon nanotubes can, beneficially, be selected from single-walled carbon nanotubes, double-walled carbon nanotubes, multi-walled carbon nanotubes, or any combination thereof.

It is to be understood that the method for providing the array of carbon nanotubes is not restricted by the above-mentioned steps, but any method (e.g. a laser vaporization method, or an arc discharge method) known in the art.

In step (b), carbon nanotube films can, beneficially, be pulled out from the super-aligned array of carbon nanotubes by the substeps of: (b1) selecting a plurality of carbon nanotube segments having a predetermined width; (b2) pulling the carbon nanotube segments at an uniform speed to form at least two carbon nanotube films; (b3) overlapping the at least two carbon nanotube films to form a carbon nanotube film structure 16.

In step (b1), quite usefully, the carbon nanotube segments having a predetermined width can be selected by using a wide adhesive tape as the tool to contact the super-aligned array. In step (b2), the pulling direction is, usefully, substantially perpendicular to the growing direction of the super-aligned array of carbon nanotubes.

More specifically, during the pulling process, as the initial carbon nanotube segments are drawn out, other carbon nanotube segments are also drawn out end to end, due to the van der Waals attractive force between ends of the adjacent segments. This process of drawing ensures that continuous carbon nanotube film is formed. The carbon nanotubes of the carbon nanotube film are all substantially parallel to the pulling direction, and the carbon nanotube film produced in such manner is able to formed to have a selectable, predetermined width.

In step (b3), after being pulled from the array of carbon nanotubes, the carbon nanotube films can, usefully, be overlapped with each other to form a carbon nanotube film structure 16. It is noted that because the carbon nanotubes in the super-aligned array in step (a) have a high purity and a high specific surface area, the carbon nanotube film is adhesive. As such, adjacent carbon nanotube films are combined by van de Waals attractive force to form a stable carbon nanotube film structure 16. The number of carbon nanotube films and the angle between the aligned directions of two adjacent carbon nanotube films may either be arbitrarily set or set according to actual needs/use. Quite usefully, in the present embodiment, the carbon nanotube film structure 16 includes 200 carbon nanotube films, and the angle between the aligned directions of two adjacent carbon nanotube films can, opportunely, be about 90°.

Quite suitably, an additional step (e) of treating the carbon nanotube film structure 16 in the cathode 10 of the lithium battery with an organic solvent can, advantageously, be further provided after step (b).

In step (e), the carbon nanotube film structure 16 can, beneficially, be treated by either of two methods: dropping an organic solvent from a dropper to soak an entire surface of the carbon nanotube film structure 16 or immersing the carbon nanotube film structure 16 into a container having an organic solvent therein. The organic solvent is volatilizable and can be selected from the group consisting of ethanol, methanol, acetone, dichloroethane, chloroform, and combinations thereof. Quite suitably, the organic solvent is ethanol. After being soaked by the organic solvent, the carbon nanotube segments in the carbon nanotube film structure 16 can, at least partially, shrink into carbon nanotube bundles due to the surface tension created by the organic solvent. Due to the decrease of the specific surface via bundling, the coefficient of friction of the carbon nanotube film structure 16 is reduced, but the carbon nanotube film structure 16 maintains high mechanical strength and toughness. As such, the carbon nanotube film structure 16 after the treating process can be used conveniently. Further, after being treated with the organic solvent, due to the shrinking of the carbon nanotube segments into carbon nanotube bundles, the parallel carbon nanotube bundles in one layer are, relatively, far apart (especially compared to the initial layout of the carbon nanotube segments) from each other and are oriented cross-wise with the parallel carbon nanotube bundles of adjacent layers. As such, the carbon nanotube film structure 16 having a microporous structure can thus be formed (i.e., the micropores are defined by the spacing/gaps between adjacent bundles).

It is to be understood that the microporous structure is related to the layered number of the carbon nanotube film structure 16. The greater the number of layers that are formed in the carbon nanotube film structure 16, the greater the number of bundles in the carbon nanotube film structure 16 will be. Accordingly, the spacing between adjacent bundles and the diameter of the micropores will decrease.

It will be apparent to those having ordinary skill in the field of the present invention that the size of the carbon nanotube film structure 16 is arbitrarily and depends on the actual needs of utilization (e.g. a miniature lithium battery). A laser beam can be used to cut the carbon nanotube film structure 16 into smaller size in open air.

In step (c), the composite film 14 can, advantageously, be formed by the substeps of: (c1) modifying the carbon nanotube film structure 16; (c2) coating the modified carbon nanotube film structure 16 with a polymer; (c3) covering the carbon nanotube film structure 16 with tin salt; (c4) hydrolyzing the tin ion in the tin salt to form the nanoscale tin oxide particles 18; and (c5) heating the carbon nanotube film structure 16 to eliminate the polymer.

In step (c1), the carbon nanotube film structure 16 is disposed in a container with an inorganic acid therein at about 90° C. to 140° C. for about 4 to 6 hours. The ends of the carbon nanotubes are opened by the corrosion of the acid. Further, the inner wall and the outer wall of the carbon nanotubes are modified (i.e. surface modification of the carbon nanotubes). In the present embodiment, the carbon nanotube film structure 16 is disposed in a super-high pressure kettle with nitric acid therein at about 120° C. for about 5 hours.

In step (c2), the modified carbon nanotube film structure 16 is immersed in a polymer solution for about 5 to 7 hours. After coated with the polymer, the carbon nanotube film structure 16 is washed to eliminate the unstable and excess polymer thereon. Quite suitably, the carbon nanotube film structure 16 is immersed in a solution of polyvinyl pyrrolidone (PVP) in ethanol or acetone solvent.

In step (c3), the polymer coated carbon nanotube film structure 16 is disposed in a container with a tin ion solution therein at about 90° C. to 110° C. for about 2 to 4 hours. Then the container is free cooled to room temperature. As such, a tin salt is formed on the surface of the polymer coated carbon nanotube film structure 16. The tin ion solution can, beneficially, be a solution of tin inorganic salt in water or tin organic compound in ethanol or acetone. The concentration of the tin ion in the solution can, opportunely, be in the approximate range from 3 mol/L to 10 mol/L. In the present embodiment, the polymer coated carbon nanotube film structure 16 is disposed in a super-high pressure kettle with a solution of dihydrate tin dichloride ($SnCl_2.2H_2O$) therein at about 100° C. for about 3 hours. After free cooled to room temperature, the excess and unstable tin salt on the carbon nanotube film structure 16 is eliminated by using acetone.

In step (c4), the carbon nanotube film structure 16 is immersed in water. The tin ion in the tin salt can be hydrolyzed to form the nanoscale tin oxide particles 18 at room temperature. Further, the tin ion can be hydrolyzed rapidly at high temperature or in alkaline condition. In the present embodiment, quite suitably, the carbon nanotube film structure 16 is immersed in ammonia at 50° C. As such, the nanoscale tin oxide particles 18 are formed and adsorbed to the walls of carbon nanotubes of the carbon nanotube film structure 16 or filled into the spacing/gaps in the carbon nanotube film structure 16.

In step (c5), the polymer coated on the carbon nanotube film structure 16 decomposes at high temperature. Quite usefully, the carbon nanotube film structure 16 with the polymer coated thereon can be heated at about 300° C. to 400° C. for about 20 to 40 minutes in protective gas (e.g. nitrogen ($N_2$), or a noble gas). In the present embodiment, the carbon nanotube film structure 16 with the polymer coated thereon is heated at about 350° C. for about 30 minutes to achieve the composite film 14.

In step (d), the current collector 12 can, beneficially, be a metal substrate. Quite suitably, the metal substrate is a copper sheet.

It is to be understood that, in step (d), the current collector 12 in the anode of the lithium battery is optional. In another embodiment, the anode of the lithium battery may only include the composite film 14. Due to a plurality of carbon nanotube films being overlapped to form a self-sustained and stable film structure, the composite film 14 can be solely used as the anode in the lithium battery without the current collector 12.

It will apparent to those having ordinary skill in the field of the present invention that the carbon nanotube film structure 16 can be directly disposed on the current collector 12 before step (c). It is noted that because the carbon nanotubes in the super-aligned array in step (a) has a high purity and a high specific surface area, the carbon nanotube film structure 16 is adhesive. As such, in step (d), the carbon nanotube film structure 16 can be adhered to the current collector 12 directly.

It is to be understood that the size of the composite film 14 can be arbitrarily set or set according to actual need (e.g. for use in a miniature lithium battery). A laser beam can be used to cut the composite film 14 into smaller size in open air.

Before testing of cycle performance of the anode 10, the lithium battery can, suitably, be assembled and sealed in an argon-filled glove box. The cathode active material can, advantageously, includes at least one material selected from a group consisting of lithium metal, lithium manganese oxide (e.g. $LiMn_2O_4$), lithium iron phosphate (e.g. $LiFePO_4$), and lithium cobalt oxide (e.g. $LiCoO_2$). The solvent can, suitably, be a mixture of two kinds of solvents. The first solvent can, opportunely, be selected from a group consisting of ethylene carbonate (EC), propylene carbonate (PC), and combinations thereof. The second solvent can, usefully, be selected from a group consisting of ethylmethyl carbonate (EMC), diethyl carbonate (DEC), diethyl carbonate (DMC), and combinations thereof. The salt can be selected from lithium hexafluorophosphate ($LiPF_6$), lithium bis (oxalate) borate (LiBOB), lithium perchlorate ($LiClO_4$), lithium terafluoroborate ($LiBF_4$), and combinations thereof.

In the present embodiment, the cathode is lithium foil and the anode is the composite film 14 using a 200-layer carbon nanotube film structure 16 disposed on the supporting member 12. A weight of the anode is about 50 micrograms. The composite film 14 can, beneficially, be cut to a round piece at a diameter of about 10 to 15 nanometers. Quite suitably, the diameter of the composite film 14 is about 13 nanometers. In the composite film 14, the tin oxide is 23 micrograms. The electrolyte is 1 mol/L Lithium Hexafluorophosphate ($LiPF_6$) filled in ethylene carbonate (EC) and diethyl carbonate (DEC). The volume ratio of EC and DMC is 1:1.

The anode of the lithium battery has high charge/discharge efficiency, high capacity, and good cycle performance. Referring to table 1, the cycle performance of the carbon-nanotube-based anode of lithium battery in room temperature is shown. The discharge capacity of the first cycle of the lithium battery is above 600 mAh/g. The efficiency of the first cycle is above 65%. After 30 cycles, the capacity loss is less than 3%.

TABLE 1

| Cycle Number | Charge Current (mAh) | Discharge Current (mAh) | Efficiency |
| --- | --- | --- | --- |
| 1 | 0 | 0.0507 | 0 |
| 2 | 0.0327 | 0.0335 | 102.3 |
| 3 | 0.0314 | 0.0327 | 104 |
| 4 | 0.0312 | 0.0319 | 102.4 |
| 5 | 0.0312 | 0.0322 | 103.3 |
| 6 | 0.0316 | 0.0328 | 103.6 |
| 7 | 0.0317 | 0.0325 | 102.3 |
| 8 | 0.0317 | 0.0328 | 103.5 |
| 9 | 0.0321 | 0.0327 | 101.9 |
| 10 | 0.0316 | 0.0326 | 103.3 |
| 11 | 0.032 | 0.033 | 103 |
| 12 | 0.0323 | 0.033 | 102.4 |
| 13 | 0.0319 | 0.0329 | 103.1 |
| 14 | 0.0324 | 0.0332 | 102.4 |
| 15 | 0.032 | 0.0325 | 101.4 |
| 16 | 0.0317 | 0.0327 | 103.2 |
| 17 | 0.0317 | 0.0322 | 101.4 |
| 18 | 0.0314 | 0.0323 | 102.6 |
| 19 | 0.0317 | 0.0323 | 102 |
| 20 | 0.0318 | 0.0327 | 102.8 |
| 21 | 0.0314 | 0.032 | 101.8 |
| 22 | 0.0315 | 0.0321 | 101.9 |
| 23 | 0.0312 | 0.0056 | 18 |

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A method for fabricating an anode of a lithium battery, the method comprising the steps of:
   (a) providing an array of carbon nanotubes;
   (b) pulling out, by using a tool, at least two carbon nanotube films from the array of carbon nanotubes to form a carbon nanotube film structure; and
   (c) dispersing a plurality of nanoscale tin oxide particles in the carbon nanotube film structure to form a composite film.

2. The method as claimed in claim 1, wherein the step (b) further comprises the substeps of:
   (b1) selecting a plurality of carbon nanotube segments having a predetermined width from the array of carbon nanotubes; and
   (b2) pulling the plurality of carbon nanotube segments at a uniform speed and perpendicular to a growing direction of the array of the carbon nanotubes, to form the at least two carbon nanotube films;
   (b3) overlapping the at least two carbon nanotube films to form the carbon nanotube film structure.

3. The method as claimed in claim 1, wherein a step of treating the carbon nanotube film structure with an organic solvent is further provided after step (b).

4. The method as claimed in claim 3, wherein the organic solvent comprises at least one material selected from the group consisting of ethanol, methanol, acetone, dichloroethane, chloroform, and combinations thereof.

5. The method as claimed in claim 3, wherein the carbon nanotube film structure is treated by dropping the organic solvent from a dropper to soak the entire surface of carbon nanotube film structure.

6. The method as claimed in claim 1, wherein in step (c), the composite film is formed by the substeps of:
   (c1) modifying the carbon nanotube film structure;
   (c2) coating the modified carbon nanotube film structure with a polymer;
   (c3) covering the polymer coated carbon nanotube film structure with a tin salt, the tin salt containing tin ions;
   (c4) hydrolyzing the tin ions in the tin salt to form the plurality of nanoscale tin oxide particles; and
   (c5) heating the carbon nanotube film structure to eliminate the polymer.

7. The method as claimed in claim 6, wherein in step (c1), the carbon nanotube film structure is treated by an inorganic acid.

8. The method as claimed in claim 6, wherein in step (c3), the polymer coated carbon nanotube film structure is covered by the tin salt by the substeps of:
   disposing the carbon nanotube film structure in a container with a tin ion solution therein at about 90° C. to about 110° C. for about 2 to about 4 hours;
   free cooling the container to room temperature to form the tin salt on the carbon nanotube film structure;
   taking out the carbon nanotube film structure from the container; and
   eliminating the excess and unstable tin salt on the carbon nanotube film structure.

9. The method as claimed in claim 8, wherein the tin ion solution is a solution of tin inorganic salt in water or tin organic compound in ethanol or acetone.

10. The method as claimed in claim 8, wherein a concentration of the tin ion in the tin ion solution is in a range from about 3 mol/L to about 10 mol/L.

11. The method as claimed in claim 6, wherein in step (c5), the carbon nanotube film structure with the polymer coated thereon is heated at about 300° C. to about 400° C. for about 20 to about 40 minutes in a protective gas, the protective gas is nitrogen, or a noble gas.

12. The method as claimed in claim 1 further comprising a step of cutting the carbon nanotube film structure into a predetermined shape and size.

13. The method as claimed in claim 1, wherein a step (d) of providing a current collector and disposing the composite film on the current collector is further provided after step (c).

* * * * *